(12) United States Patent
Marupaduga et al.

(10) Patent No.: US 11,064,395 B1
(45) Date of Patent: Jul. 13, 2021

(54) ENSURING QUALITY OF SERVICE AT A CELL SITE ROUTER

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 20 days.

(21) Appl. No.: 16/712,025

(22) Filed: Dec. 12, 2019

(51) Int. Cl.
| | |
|---|---|
| *H04W 28/24* | (2009.01) |
| *H04W 28/02* | (2009.01) |
| *H04W 8/18* | (2009.01) |
| *H04L 12/725* | (2013.01) |
| *H04W 40/02* | (2009.01) |
| *H04W 88/12* | (2009.01) |
| *H04L 12/24* | (2006.01) |

(52) U.S. Cl.
CPC .......... *H04W 28/24* (2013.01); *H04L 45/302* (2013.01); *H04L 45/306* (2013.01); *H04W 8/18* (2013.01); *H04W 28/0268* (2013.01); *H04W 40/02* (2013.01); *H04L 41/5003* (2013.01); *H04L 41/5019* (2013.01); *H04W 88/12* (2013.01)

(58) Field of Classification Search
CPC . H04W 28/24; H04W 28/0268; H04W 28/16; H04W 28/0967; H04W 8/18; H04W 40/02; H04W 88/12; H04W 52/26; H04W 52/265; H04L 45/302; H04L 45/306; H04L 29/26503; H04L 41/5003; H04L 47/24; H04L 47/805; H04L 47/2458; H04L 65/80; H04L 67/322; H04L 43/08; H04L 1/1854; H04L 41/5019; H04L 41/5022

See application file for complete search history.

(56) References Cited

U.S. PATENT DOCUMENTS

| | | | |
|---|---|---|---|
| 8,184,528 | B2 | 5/2012 | Parker |
| 9,520,980 | B1 * | 12/2016 | Ramamurthy ........ H04L 5/0094 |
| 9,642,032 | B2 | 5/2017 | Berzin et al. |
| 10,333,853 | B1 * | 6/2019 | Seshadri ............... H04L 5/0064 |
| 2006/0039381 | A1 * | 2/2006 | Anschutz ............. H04L 47/801 |
| | | | 370/395.21 |
| 2014/0016464 | A1 * | 1/2014 | Shirazipour ............ H04L 47/24 |
| | | | 370/235 |

(Continued)

FOREIGN PATENT DOCUMENTS

WO 2019089027 A1 5/2019

*Primary Examiner* — Warner Wong

(57) ABSTRACT

Ensuring a quality of service for a wireless device attached to an access node by receiving a data packet at a routing node communicably coupled to the access node, wherein the data packet is transmitted by the wireless device to the access node using a bearer that is associated with a first priority level, determining that the data packet is marked with a first quality of service indicator that is associated with a second priority level that is lower than the first priority level, and marking the data packet with a second quality of service indicator that is associated with the first priority level prior to forwarding the data packet to a destination node. The routing node comprises a cell site router configured to receive the data packet from the access node, and the priority levels include QoS parameters such as DSCP and QCI values.

13 Claims, 6 Drawing Sheets

(56) References Cited

U.S. PATENT DOCUMENTS

| | | | |
|---|---|---|---|
| 2015/0110009 A1* | 4/2015 | Berzin | H04L 45/302 |
| | | | 370/329 |
| 2015/0110044 A1* | 4/2015 | Berzin | H04W 28/0252 |
| | | | 370/329 |
| 2015/0156082 A1* | 6/2015 | Kakadia | H04L 47/50 |
| | | | 709/223 |
| 2016/0150439 A1* | 5/2016 | Drevon | H04W 28/0263 |
| | | | 370/230 |
| 2016/0286437 A1* | 9/2016 | Enomoto | H04W 28/24 |
| 2017/0142611 A1* | 5/2017 | Andgart | H04W 28/0268 |
| 2017/0324652 A1* | 11/2017 | Lee | H04L 43/16 |
| 2019/0268266 A1* | 8/2019 | Mathison | H04W 8/24 |
| 2019/0297541 A1* | 9/2019 | Chandramouli | H04L 12/4633 |
| 2020/0021513 A1* | 1/2020 | Hegde | H04L 43/0805 |
| 2020/0053013 A1* | 2/2020 | Viljamaa | H04L 47/2441 |

* cited by examiner

ENSURING QUALITY OF SERVICE AT A CELL SITE ROUTER

TECHNICAL BACKGROUND

As wireless networks evolve and grow, there are ongoing challenges in providing high-quality service to increasing numbers of wireless devices in various coverage areas of a wireless network. Different wireless devices are configured to use different types of applications (such as voice over IP, streaming, gaming, etc.), and each different application may optimally function with a different channel size or bandwidth. Further, radio access technologies (RATs) such as 5G New Radio (NR) are being implemented alongside existing RATs such as 3G and 4G Long Term Evolution (LTE), and wireless devices are increasingly becoming more capable of connecting to these RATs. While channel bandwidths in 4G are static, 5G is capable of deploying various different bandwidths, most of which are higher than 4G bandwidths. Further, "Dual Connectivity" refers to the ability for wireless devices to attach to two or more access nodes and transmit/receive information via two wireless connections simultaneously. In exemplary situations, dual connectivity can include E-UTRAN-NR Dual Connectivity (EN-DC), which uses both 4G and 5G RATs.

However, there are problems associated with utilizing dual connectivity in heterogenous networks. In particular, different elements within a heterogeneous wireless network may be configured with different set of parameters. Data packets marked with a first quality of service (QoS) indicator by one network element or node may be treated differently when a different network element or node is traversed. For example, a data packet may be assigned a differentiated services code point (DSCP) value by a dual-connectivity access node, wherein the DSCP value does not correlate with the type of radio access network (RAN) or type of bearer on which the data packet is being transported. For example, the DSCP value may not match a quality of service class indicator (QCI) of the RAN (or bearer associated therewith). Such a mismatch between two different QoS indicators (e.g. DSCP and QCI) can cause dropped packets, or reduced quality of service for end-user wireless devices attached to such heterogeneous wireless networks, particularly when different network nodes (such as access nodes) are configured with different values.

OVERVIEW

Exemplary embodiments described herein include systems and methods for ensuring a quality of service at a cell site router coupled to an access node at which data packets are received from wireless devices attached to the access node. An exemplary method described herein for ensuring a quality of service includes receiving, at a routing node communicably coupled to the access node, a data packet transmitted by the wireless device to the access node, wherein the data packet is associated with a first quality of service, determining that a quality of service indicator of the data packet does not match the first quality of service, and changing the quality of service indicator of the data packet prior to forwarding the data packet to a destination node.

An exemplary system described herein for ensuring a quality of service includes an access node configured to receive a data packet from a wireless device via a first radio access network (RAN), and a cell site router (CSR) coupled to the access node, the CSR being configured to perform operations including receiving the data packet from the access node, determining a mismatch between a first quality of service indicator of the data packet and a second quality of service indicator of the data packet, and changing the second quality of service indicator of the data packet to cure the mismatch.

Another exemplary method described herein for ensuring a quality of service includes receiving a data packet at a routing node communicably coupled to the access node, wherein the data packet is transmitted by the wireless device to the access node using a bearer that is associated with a first priority level, determining that the data packet is marked with a first quality of service indicator that is associated with a second priority level that is lower than the first priority level, and marking the data packet with a second quality of service indicator that is associated with the first priority level prior to forwarding the data packet to a destination node. The routing node can include a cell site router configured to receive the data packet from the access node, and to store a priority table from which the second quality of service indicator can be obtained.

DETAILED DESCRIPTION

Figure 1:
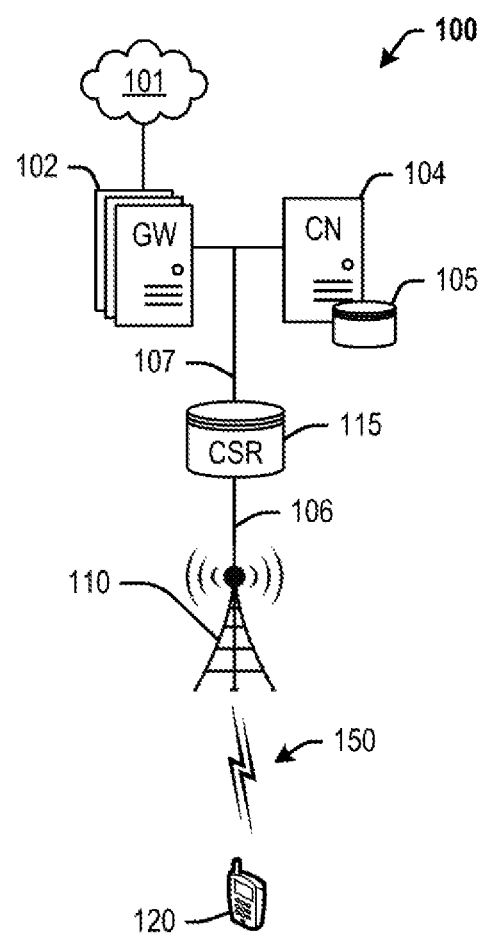
FIG. 1 depicts an exemplary system for ensuring a quality of service.

Exemplary embodiments described herein include systems and methods for ensuring a quality of service for data packets received at a cell site router coupled to a dual-connectivity access node. Exemplary access nodes described herein are capable of dual connectivity using at least two radio access technologies (RATs), including 4G LTE and 5G NR, with the access nodes and/or wireless devices attached thereto being configured to mark data packets with an incorrect or mismatched DSCP value. Exemplary cell site routers described herein include any node that is configured to route incoming data packets from a network/gateway node to an access node, and to route outgoing data packets from the access node (and originating at UEs attached thereto) to the network/gateway node. Further, exemplary cell site routers described herein are configured to adjust a priority level of outgoing data packets to match a priority level of a bearer transporting the outgoing data packets. The exemplary embodiments disclosed herein thus include identifying a mismatch between a DSCP value of the data packets (transported, for example, using a 5G RAN or bearer associated therewith) and a QCI of the RAN or bearer themselves. The mismatch is corrected at the cell site router, and the data packets are therefore prioritized over other data packets that are correctly assigned lower-priority DSCP values.

Thus, an exemplary method described herein ensures a quality of service by receiving a data packet at a routing node communicably coupled to the access node, wherein the data packet is transmitted by the wireless device to the access node using a bearer that is associated with a first priority level, determining that the data packet is marked with a first quality of service indicator that is associated with a second priority level that is lower than the first priority level, and marking the data packet with a second quality of service indicator that is associated with the first priority level prior to forwarding the data packet to a destination node. The routing node can include a cell site router configured to receive the data packet from the access node, and to store a priority table from which the second quality of service indicator can be obtained.

Similarly, a method for ensuring a quality of service for a wireless device attached to an access node includes receiving, at a routing node communicably coupled to the access node, a data packet transmitted by the wireless device to the access node, wherein the data packet is associated with a first quality of service, determining that a quality of service indicator of the data packet does not match the first quality of service, and changing the quality of service indicator of the data packet prior to forwarding the data packet to a destination node. The data packet is received at the access node prior to being received at the routing node, and it is determined that the data packet is associated with the first quality of service based on a quality of service class indicator (QCI). The QCI is associated with a first type of radio access network (RAN) such as 5G NR, and/or a bearer between the wireless device and the access node that is associated with the 5G NR RAT. Determining that the quality of service indicator does not match the first quality of service comprises determining a mismatch between the quality of service indicator and the QCI. For example, the access node (e.g. an eNodeB or a gNodeB) can be configured to assign a DSCP value to the data packet that does not match the QCI of the 5G RAT or bearer transporting the data packet. Thus, a new DSCP value can be selected that matches the QCI. The new DSCP value can be obtained from a table stored on the cell site router, such as a priority table, routing table, etc. As a result, the data packet is prioritized with a higher priority before sending it to the gateway/network versus having a lower priority that does not match the QCI. In other words, the QCI of the RAT and/or bearer is used to determine the appropriate DSCP value at the cell site router.

Consequently, further described herein is a system for ensuring a quality of service, the system including an access node configured to receive a data packet from a wireless device via a first radio access network (RAN), and a cell site router (CSR) coupled to the access node, the CSR being configured to perform operations including receiving the data packet from the access node, determining a mismatch between a first quality of service indicator associated with the data packet and a second quality of service indicator associated with the first RAN, and changing the first quality of service indicator associated with the data packet to cure the mismatch. In this embodiment, the first quality of service indicator comprises a DSCP value, and the second quality of service indicator comprises a QCI. The QCI is associated with a bearer set up using the first RAN, which can include a 5G NR RAN. Determining the mismatch includes determining that the DSCP value of the data packet is not correlated with the QCI, and changing the second quality of service indicator to cure the mismatch includes selecting a new DSCP value for the data packet that is correlated with the QCI.

These and other embodiments are further described with reference to FIGS. 1-6 below.

FIG. 1 depicts an exemplary system for ensuring a quality of service. System 100 comprises a communication network 101, gateway node(s) 102, controller node 104, access node 110, cell site router 115, and wireless device 120. In other embodiments, any other combination of cell site routers, access nodes, and wireless devices may be evident to those having ordinary skill in the art in light of this disclosure. In this exemplary embodiment, access node 110 may be a macrocell access node configured to deploy dual-connectivity wireless air-interfaces 150 to which wireless device 120 can attach. For example, access node 110 can include a combination of a 4G eNodeB and a 5G gNodeB. In other words, the access node 110 can comprise antennae that are configured to communicate using 4G LTE (i.e. the first RAT) as well as antennae that are configured to communicate using 5G NR (the second RAT). Further, the access node 110 can include a plurality of antennae (or antenna elements), a portion of which is configured to deploy a first bandwidth or RAT (e.g. 4G LTE), and a portion of which is configured to deploy a second bandwidth or RAT (e.g. 5G NR). Further, as described herein, wireless device 120 is capable of dual connectivity, i.e. simultaneously communicating with access node 110 using both wireless air interfaces 150. Further, cell site router 115 includes any node that is configured to route incoming data packets from network 101 and/or gateway node(s) 102 to access node 110 (and wireless device 120), and to route outgoing data packets received from the access node 110 (and originating at wireless device 120) to the gateway node(s) 102 and/or network 101. Further, as described herein, cell site router 115 is configured to adjust a priority level of outgoing (i.e. uplink) data packets to match a priority level of a bearer transporting the outgoing data packets. This can include identifying a mismatch between a DSCP value of the uplink data packets (transported, for example, using a 5G RAN 150 or bearer associated therewith) and a QCI of the RAN 150 or bearer themselves. The mismatch is corrected at the cell site router 115, and the data packets are therefore prioritized over other data packets that are appropriately-assigned lower-priority DSCP values.

Access node 110 can be any network node configured to provide communication between wireless device 120 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further, access node 110 may comprise any short range, low power, small-cell access nodes such as a microcell access node, a picocell access node, a femtocell access node, or a home eNodeB device.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107.

Wireless device 120 may be any device, system, combination of devices, or other such communication platform capable of communicating wirelessly with access node 110 using one or more frequency bands deployed therefrom. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as priority and routing tables for different types of data packets and bearers, associations between different QoS parameters, and so on. This information may be requested by or shared with cell site router 115, gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
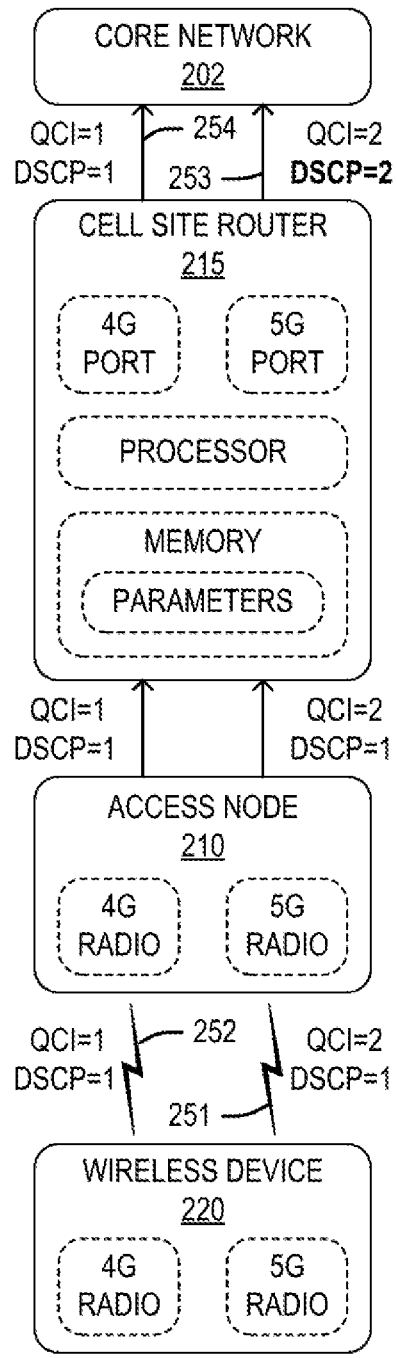
FIG. 2 depicts a schematic of an exemplary cell site router for ensuring a quality of service.

FIG. 2 depicts a schematic of an exemplary cell site router for ensuring a quality of service. Similar to system 100, cell site router 215 is illustrated as being coupled to a dual-connectivity access node 210, and capable of communicating with core network 202 (which can include gateway nodes, controller nodes, and other interfaces to an external network). Cell site router 215 can include any node that is configured to route data packets between core network 202 and access node 210 via one or more ports. Cell site router 215 is illustrated as having 4G ports and 5G ports which are used to transport data packets that are associated with 4G and/or 5G RATs and, therefore, prioritized accordingly. In addition to a processor and memory, cell site router 215 can also include other components not illustrated herein, such as buffers for different types of data packets, transceivers, etc. Further, cell site router 215 is configured to adjust a priority level of outgoing data packets (originating from wireless device 220) to match a priority level of a bearer transporting the outgoing data packets, such that the data packets are prioritized.

For example, wireless device 220 and access node 210 are both capable of dual connectivity using at least two RATS (in this case 4G and 5G). Thus, wireless device 220 can transmit uplink packets via a 5G RAN 251 and a 4G RAN 252. In this exemplary embodiment, while the 5G RAN is associated with a QCI level of 2, a DSCP value of a data packet transported on 5G RAN 251 may be marked as 1. In other words, a bearer transporting the data packet across the 5G RAN is marked with a QCI level of 2. It should be understood that the values 2 and 1 are merely exemplary and intended to show a mismatch between the two values. For example, the QCI level of 2 may be associated with a higher priority, and the DSCP value of 1 may be associated with a lower priority. For example, a data packet transmitted using the 4G RAN 252 is marked with a DSCP value of 1, with a QCI level of the bearer/RAN also being 1. Thus, the DSCP value matches the QCI level for the 4G RAN 252. The mismatched values for the 5G data packets may be assigned by any combination of access node 210 and wireless device 220, as described above.

In either case, access node 210 continues to transmit the data packets to cell site router 215 with the same DSCP assignments (DSCP=1 for both 4G and 5G data packets). Upon receipt, cell site router 215 is configured to determine that the 5G data packet is marked with a DSCP value that is not associated with the same priority level as the bearer's QCI level of 2. The mismatch may be determined by referring to parameter list stored on the memory of cell site router 215. In an exemplary embodiment, the parameter list may be provisioned or updated by a network operator with the most up-to-date correlations between DSCP, QCI, and other QoS parameters, whereas access node 210 and/or wireless device 220 may be using expired correlations. Thus, responsive to determining the mismatch, cell site router 215 can change the DSCP value of the data packet with a value that is associated with the QoS level of 1, prior to forwarding the data packet to the core network 202. As a result, the data packet is prioritized with a higher priority before sending it to the core network 202 versus having a lower priority that does not match the QCI level of the RAT/bearer used to transport the data packet. In other words, the QCI of the RAT and/or bearer is used to determine the appropriate DSCP value at the cell site router 215.

Figure 3:
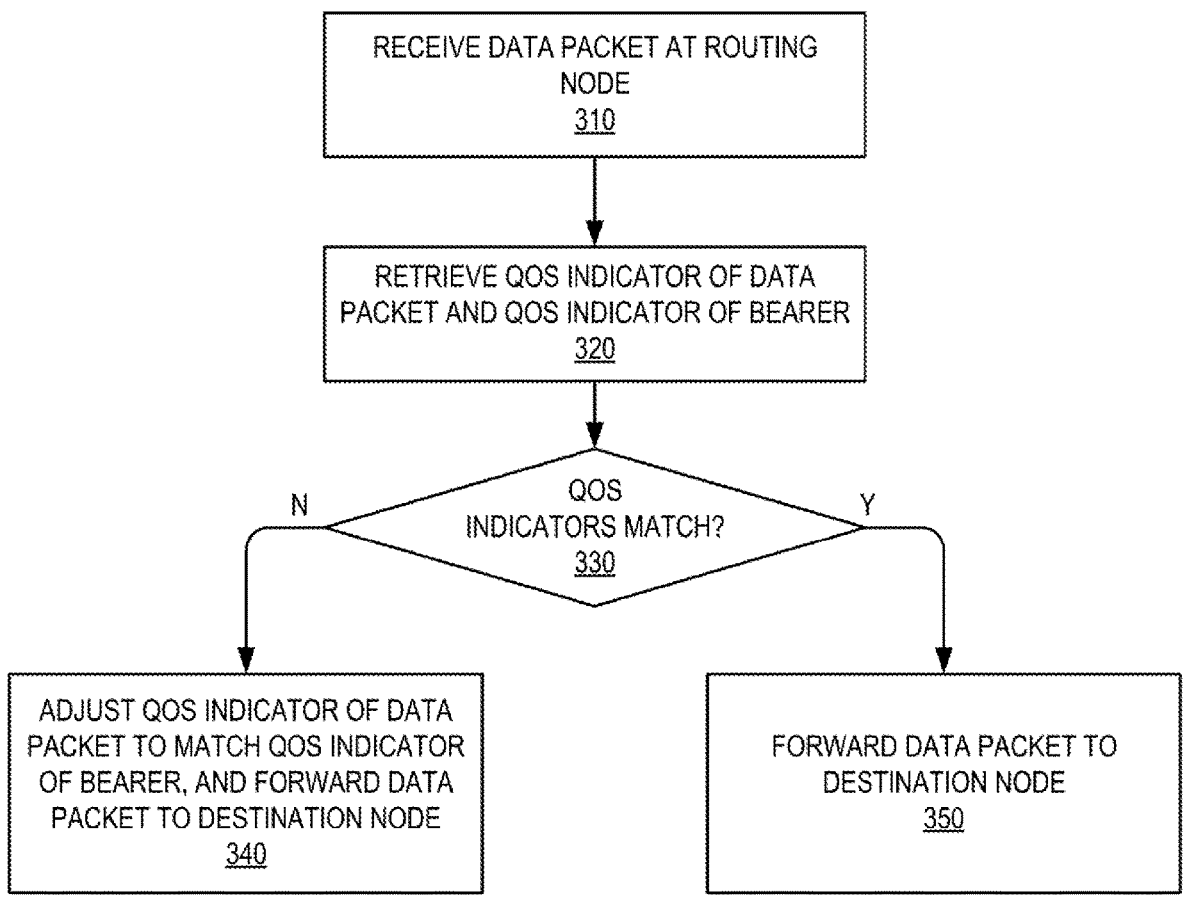
FIG. 3 depicts an exemplary method for ensuring a quality of service.

FIG. 3 depicts an exemplary method for ensuring a quality of service. The exemplary method of FIG. 3 may be implemented using components similar to those described above, such as cell site router 115, 215. Although FIG. 3 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 310, the method includes receiving, at a routing node (i.e. cell site router) communicably coupled to the access node, a data packet transmitted by a wireless device to an access node, wherein the data packet is associated with a first quality of service. The data packet is received at the access node prior to being received at the routing node, and at 320, QoS indicators of the data packet and the bearer transporting the data packet are retrieved. The QCI is associated with a first type of radio access network (RAN) such as 5G NR, and/or a bearer between the wireless device and the access node that is associated with the 5G NR RAT.

At 330, a database on the cell site router is referred to for determining whether or not the quality of service indicator matches the QCI. For example, the access node (e.g. an eNodeB or a gNodeB) can be configured to assign a DSCP value to the data packet that does not match the QCI of the 5G RAT or bearer transporting the data packet. If there is a mismatch, then at 340 a QoS indicator (i.e. DSCP value) can be selected that matches the QCI of the bearer. The new DSCP value can be obtained from a table stored on the cell site router, such as a priority table, routing table, etc.

As a result, the data packet is prioritized with a higher priority before sending it to the gateway/network versus having a lower priority that does not match the QCI. In other words, the QCI of the RAT and/or bearer is used to determine the appropriate DSCP value at the cell site router. Whereas, if there is no mismatch, then the data packet is forwarded without changing the QoS indicator of the data packet.

Figure 4:
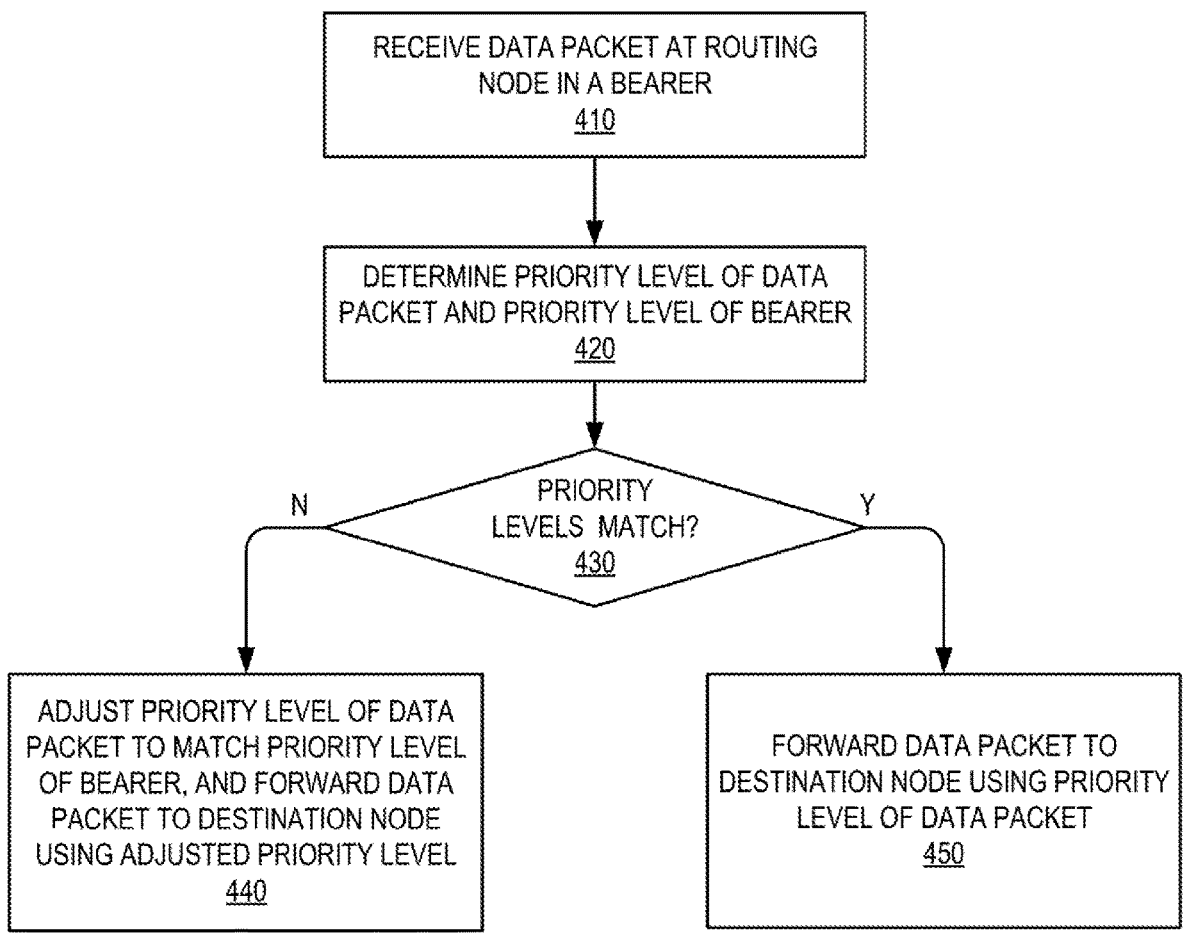
FIG. 4 depicts another exemplary method for ensuring a quality of service.

FIG. 4 depicts another exemplary method for ensuring a quality of service. The exemplary method of FIG. 4 may be implemented using components similar to those described above, such as cell site router 115, 215. Although FIG. 4 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, the method includes receiving, at a routing node (i.e. cell site router) communicably coupled to the access node, a data packet transmitted by a wireless device to an access node, wherein the data packet is associated with a first quality of service, and received in a bearer. The data packet is received at the access node prior to being received at the routing node, and at 420, priority levels of the data packet and the bearer transporting the data packet are retrieved. The priority levels may be associated with a DSCP value for the data packet, or a QCI associated with the bearer. In other embodiments, the priority levels may be correlated with any other QCI indicator.

At 430, a database on the cell site router is referred to for determining whether or not the priority levels of the data packet and the bearer match. For example, the access node (e.g. an eNodeB or a gNodeB) can be configured to assign a DSCP value to the data packet that does not match the QCI of the 5G RAT or bearer transporting the data packet. In this case, there is a mismatch, and at 440 a priority level can be selected for the data packet that matches the priority level of the bearer. For example, a new DSCP value can be obtained from a table stored on the cell site router, such as a priority table, routing table, etc. As a result, the data packet is prioritized with a higher priority before sending it to the gateway/network versus having a lower priority that does not match the QCI. Whereas, if there is no mismatch, then the data packet is forwarded to the core network or destination node using the assigned priority level or DSCP value.

Figure 5:
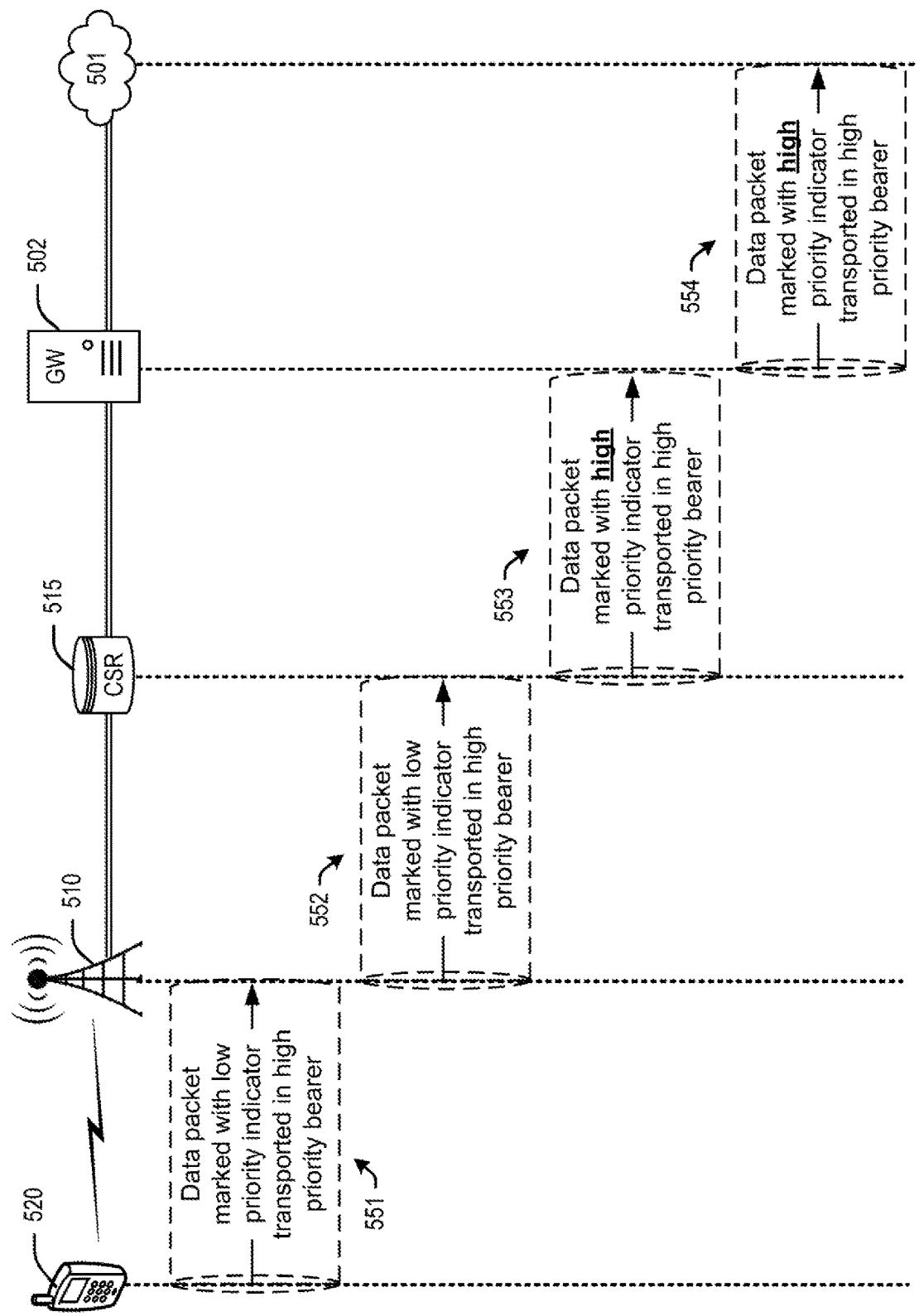
FIG. 5 depicts an exemplary network flow for ensuring a quality of service.

FIG. 5 depicts an exemplary network flow for communicating with a wireless device via at least two access nodes. The exemplary network flow of FIG. 5 may be implemented using components similar to those depicted in system 100, such as a network 501, gateway(s) 502, cell site router 515, access node 510, and wireless device 520. In this embodiment, access node 510 and wireless device 520 communicate with one another via any number of wireless air-interfaces using LTE-uu or other wireless interfaces, and access node 510, cell site router 515, gateway 502, and network 501 can communicate with each other using any wired or wireless interface, including S4, S5, S11, S1-MME, or S1-U interface. Although FIG. 5 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional components such as additional gateways, proxy servers, home subscriber servers (HSS), and signaling performed between elements, may be apparent to those having ordinary skill in the art in light of this disclosure.

Similar to system 100, cell site router 515 can include any node that is configured to route data packets between gateway 502 and access node 510. For example, cell site router 515 may include 4G ports and 5G ports which are used to transport data packets that are associated with 4G and/or 5G RATs and, therefore, prioritized accordingly. Further, cell site router 515 is configured to adjust a priority level of outgoing or uplink data packets (originating from wireless device 520) to match a priority level of a bearer transporting the outgoing data packets, such that the data packets are prioritized.

For example, wireless device 520 and access node 510 are both capable of dual connectivity using at least two RATS (in this case 4G and 5G). Thus, at 552, wireless device 520 can transmit uplink packets via a bearer associated with a high priority, whereas the data packet itself is associated with a low priority. For example, while the bearer is associated with a QCI level that is correlated with a higher priority (for instance, because it is a 5G bearer), a DSCP value of the data packet transported within the bearer may be marked as a lower priority DSCP value, potentially due to a marking error, or an out-of-date association between the two priority values. The error can be caused by any combination of access node 510 and wireless device 520, as described above.

In either case, at 552, access node 510 continues to transmit the data packets to cell site router 515 with the same low-priority indicator and in the same (or different) high-priority bearer. For example, different types of bearers can be set up between different network nodes, including EPS bearers, end-to-end bearers, wireless bearers, etc. In either case, the data packet at 552 continues to have a low priority indicator (e.g. a low DSCP value) while being associated with a higher-priority bearer or RAN. Thus, upon receipt, cell site router 515 is configured to perform the operations described above, i.e. to determine that the data packet is marked with a DSCP value that is not associated with the same priority level as the bearer's QCI level. The mismatch may be determined by referring to parameter list stored on the memory of cell site router 515. In an exemplary embodiment, the parameter list may be provisioned or updated by a network operator with the most up-to-date correlations between DSCP, QCI, and other QoS parameters, whereas access node 510 and/or wireless device 520 may be using expired correlations.

Thus, responsive to determining the mismatch, at 553 cell site router 515 can change the priority level indicator of the data packet with a value that is associated with the priority level of the bearer, and forward the prioritized data packet to the gateway 502. As a result, the data packet is prioritized with a higher priority before sending it to the network 501 versus having a lower priority that does not match the QCI level of the RAT/bearer used to transport the data packet. In other words, the QCI of the RAT and/or bearer is used to determine the appropriate DSCP value at the cell site router 515.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: cell site router 115, gateway node(s) 102, controller node 104, access node 110, and/or network 101.

Figure 6:
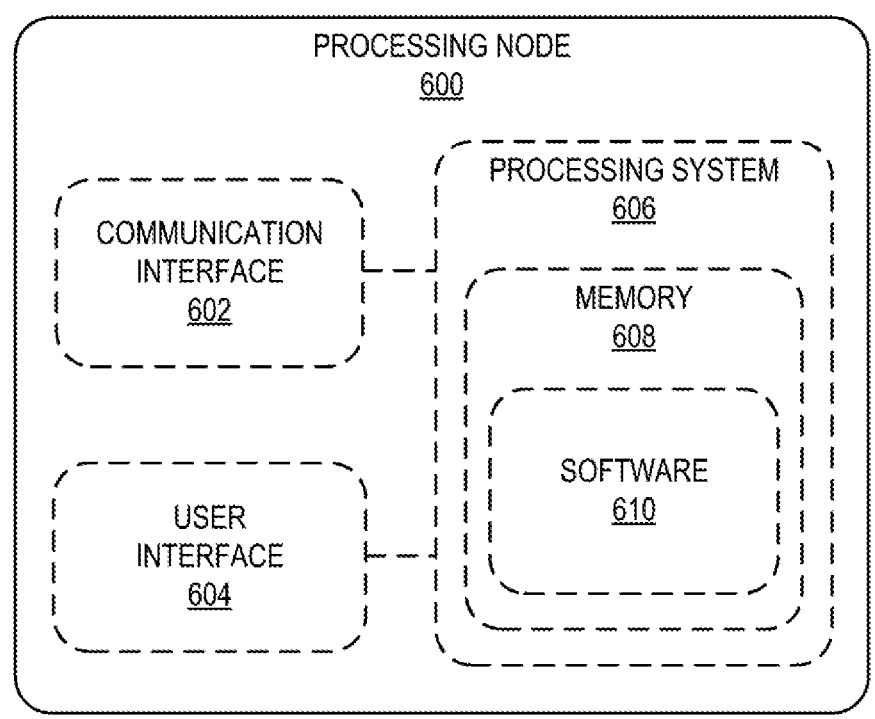
FIG. 6 depicts an exemplary processing node for ensuring a quality of service.

FIG. 6 depicts an exemplary processing node for scheduling resources for relay access nodes in a wireless network. Processing node 600 comprises a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a module for performing transmission power control operations described herein. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for ensuring a quality of service for a wireless device attached to an access node, the method comprising:
   receiving, at a routing node communicably coupled to the access node, a data packet transmitted by the wireless device to the access node, wherein the data packet is associated with a first quality of service;
   determining that the data packet is associated with the first quality of service based on a quality of service class indicator (QCI);
   determining a mismatch between a quality of service indicator of the data packet and the QCI, wherein the quality of service indicator comprises a differentiated services code point (DSCP) value; and
   changing the quality of service indicator of the data packet prior to forwarding the data packet to a destination node, wherein changing the quality of service indicator comprises selecting a new DSCP value that matches the QCI.

2. The method of claim 1, wherein the data packet is received at the access node prior to being received at the routing node.

3. The method of claim 1, wherein the QCI is associated with a first type of radio access network (RAN).

4. The method of claim 3, wherein the RAN comprises 5G.

5. The method of claim 4, wherein the QCI is associated with a 5G bearer between the wireless device and the access node.

6. The method of claim 1, further comprising prioritizing the data packet responsive to changing the quality of service indicator.

7. A system for ensuring a quality of service, the system comprising:
   an access node configured to receive a data packet from a wireless device via a first radio access network (RAN); and
   a cell site router (CSR) coupled to the access node, the CSR being configured to perform operations comprising:
      receiving the data packet from the access node;
      determining a mismatch between a first quality of service indicator associated with the data packet and a second quality of service indicator associated with the first RAN; and
      changing the first quality of service indicator associated with the data packet to cure the mismatch;
      wherein the first quality of service indicator comprises a differentiated services code point (DSCP) value, and the second quality of service indicator comprises a quality of service class identifier (QCI), and
      wherein changing the second quality of service indicator to cure the mismatch comprises selecting a new DSCP value for the data packet that is correlated with the QCI.

8. The system of claim 7, wherein the QCI is associated with a bearer set up using the first RAN.

9. The system of claim 7, wherein determining the mismatch comprises determining that the DSCP value of the data packet is not correlated with the QCI.

10. A method for ensuring a quality of service for a wireless device attached to an access node, the method comprising:
    receiving a data packet at a routing node communicably coupled to the access node, wherein the data packet is transmitted by the wireless device to the access node using a bearer that is associated with a first priority level, wherein the first priority level is based on a quality of service class indicator (QCI);
    determining that a mismatch between a first quality of service indicator of the data packet and the first priority level; and
    marking the data packet with a second quality of service indicator that is associated with the first priority level prior to forwarding the data packet to a destination node;
    wherein the first and second quality of service indicators respectively comprise first and second differentiated services code point (DSCP) values; and
    wherein marking the data packet with the second quality of service indicator comprises selecting the second DSCP value that matches the first priority level.

11. The method of claim 10, wherein the routing node comprises a cell site router.

12. The method of claim 11, wherein the cell site router is configured to receive the data packet from the access node.

13. The method of claim 10, further comprising looking up the second quality of service indicator from a priority table stored on the routing node.

* * * * *